J. D. RICE.
Steam Register.

No. 7,583.  Patented Aug. 20, 1850.

UNITED STATES PATENT OFFICE.

JAMES D. RICE, OF PHILADELPHIA, PENNSYLVANIA.

REGISTER FOR STEAM-BOILERS.

Specification of Letters Patent No. 7,583, dated August 20, 1850.

*To all whom it may concern:*

Be it known that I, JAS. D. RICE, of Philadelphia, in the county of Philadelphia and State of Pennsylvania, have invented a new and useful Improvement on the Registers for Steam-Boilers and I do hereby declare that the following is a full and exact description.

The nature of my invention consists in connecting a registering apparatus combined with a steam pressure gage, and water-line gage to the gage cocks of steam boilers in such manner as by opening and closing the gage cocks, the pressure of steam and the height of water of steam boilers, and, also, the intervals of time elapsing between trying the gage cocks, shall be registered upon paper or other suitable material.

To enable others to make and use my invention I will proceed to describe the annexed drawings, which form part of this specification, and in which—

Figure 1:
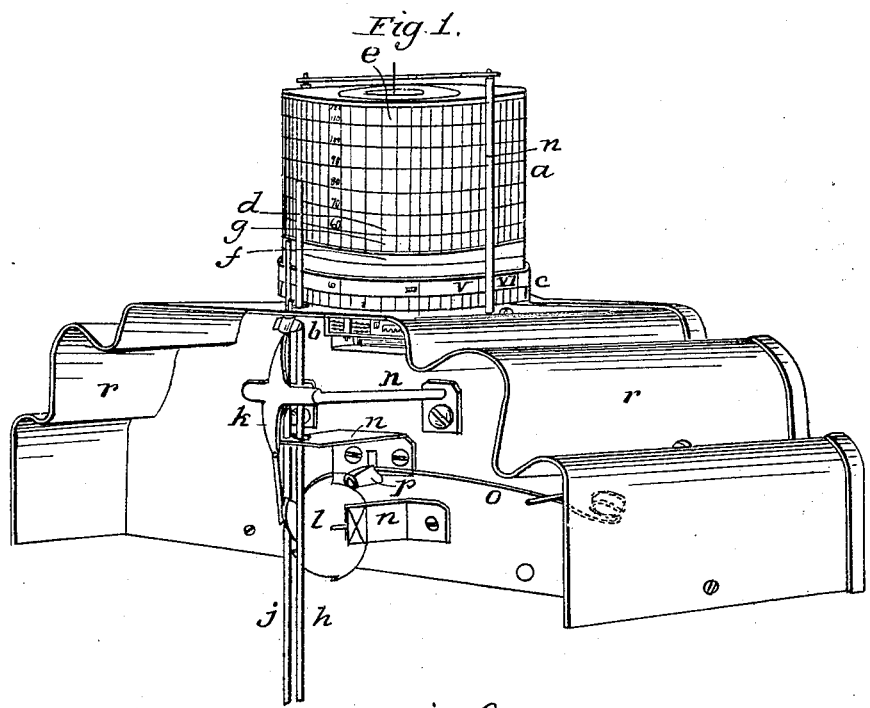
Figure 2:
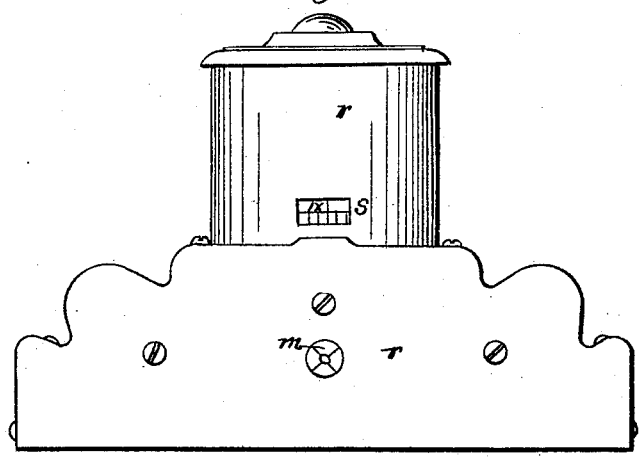

Figure 1 is a perspective view, and Fig. 2 an elevation.

$a$ is a cylinder made to revolve around once in twelve hours, by clock work shown at $b$, around this cylinder is placed a paper ruled in vertical and horizontal lines of any distance apart required, the paper is held in its place by a band $c$ upon the end of the cylinder, this band is divided and marked into hours and tenths from one hour to twelve, and the vertical lines on the paper correspond with the graduated band, the horizontal lines from $d$ to $e$ are of a sufficient number and distance apart to record the height of water, which should never be so low as to register below $f$, from $g$ to $d$ being the height to which the water line should register. $h$ steam gage indicator with a sharp point attached to the end, $i$ water line indicator with a sharp point (blade like) at the end, $k$ a lever whose fulcrum is near its center. This lever is acted upon by the ratchet wheel $l$ thereby depressing the indicators $h$ and $i$, the one for steam making a round hole in the paper and the one for the water line a cut horizontally, the ratchet-wheel is turned by a lever which is connected with the gage cocks $m$ so that at each opening of the gage cocks motion is communicated to the ratchet wheel causing it to revolve one notch, thereby depressing the indicators and registering the pressure of steam, the water line, and time of trying the gage cocks.

$n \ n \ n \ n$ are standards or posts to support the different parts described.

$o$ is a spring used here only to throw back the lever $p$ which is connected with the gage $m$, $r \ r \ r \ r$ the outside, or case, the part covering the cylinder is taken off in Fig. 1, in Fig. 2 it is in its place and at S is an opening covered with glass showing the graduated hand for the purpose of giving the time of day.

I am aware that the ends of gage rods have been combined with a sheet of paper moved by clock work in such a manner that the indications of the rods shall be marked upon the paper either by a continuous line or, a series of pricks, or, by both, the intervals betwen each prick being regulated by clock work. I do not claim any such device. but What I do claim as of my invention and desire to secure by Letters Patent is, Connecting the gage rods with the gage cocks in such manner as herein described that the pressure of steam and height of water shall be registered each time the gage cocks are tried, the register indicating at the same time, the period of time of trying of the gage cocks by opening and closing them.

JAS. D. RICE.

Witnesses:
A. C. ROBERTS,
W. BUCHARD.